(12) United States Patent
McGrath

(10) Patent No.: US 6,588,804 B2
(45) Date of Patent: Jul. 8, 2003

(54) METHOD AND APPARATUS FOR MONITORING PIPELINE EXPANSION JOINT CONDITIONS

(75) Inventor: David F. McGrath, Garden Ridge, TX (US)

(73) Assignee: Senior Flexonics, Inc., Bartlett, IL (US)

( * ) Notice: Subject to any disclaimer, the term of this patent is extended or adjusted under 35 U.S.C. 154(b) by 0 days.

(21) Appl. No.: 09/785,368

(22) Filed: Feb. 16, 2001

(65) Prior Publication Data

US 2002/0113435 A1 Aug. 22, 2002

(51) Int. Cl.$^7$ ................................................. F16L 27/12
(52) U.S. Cl. ................... 285/299; 285/93; 285/227; 285/301; 285/900
(58) Field of Search .......................... 285/93, 299, 300, 285/301, 227, 900, 904; 137/487.5, 488

(56) References Cited

U.S. PATENT DOCUMENTS 4,511,162 A  4/1985  Broyles ....................... 285/93

OTHER PUBLICATIONS

Technical Bulletin 95–1, published by Piping Technology & Products, Inc., 1995.
Printout of web page for Thorburn Equipment Inc., titled "Custom Flexible Piping & Ducting Systems", on pressure piping expansion joints, Series IPBE, published 2000.
Printout of web page for Thorburn Equipment Inc., titled "Custom Flexible Piping & Ducting Systems", on pressure piping expansion joints, Series PBES and PBEU, published 2000.
"Expansion Joint Catalog" by Piping Technology & Products, Inc., 1997, titled "In–Line Pressure Balanced Expansion Joints".
Technical Bulletin "Pressure Balanced Expansion Joint", published by Piping Technology & Products, Inc., 1995.

*Primary Examiner*—James M. Hewitt
(74) *Attorney, Agent, or Firm*—Greenberg Traurig, P.C.

(57) ABSTRACT

A method and apparatus for monitoring a pipeline expansion joint, in particular the conditions of a pressure-balanced expansion joint. A sensor is positioned so as to sense one or more physical characteristics of a pipeline fluid flow. A signal generated by the sensor(s) is received by a suitably configured electronic controller. The controller, in turn, is connected to a flow control valve, that is movable between at least an "off" or "no-flow" position, and a flow permitting position, connecting a source of compressible medium and the volume confined between the two (or more) balancing bellows of a pressure-balanced expansion joint. An accumulator may also be provided, that may be connectable via the flow control valve, to the confined volume. The controller will be operably configured to cause the valve to be moved, in response to signals received from the sensor(s) that correspond to stored numerical data in the controller that represent different potential operating conditions. In an alternative embodiment, the controller may also be suitably connected to various external communication devices, for communication of a signal representative of, e.g., a failure condition, to a predesignated recipient.

8 Claims, 3 Drawing Sheets

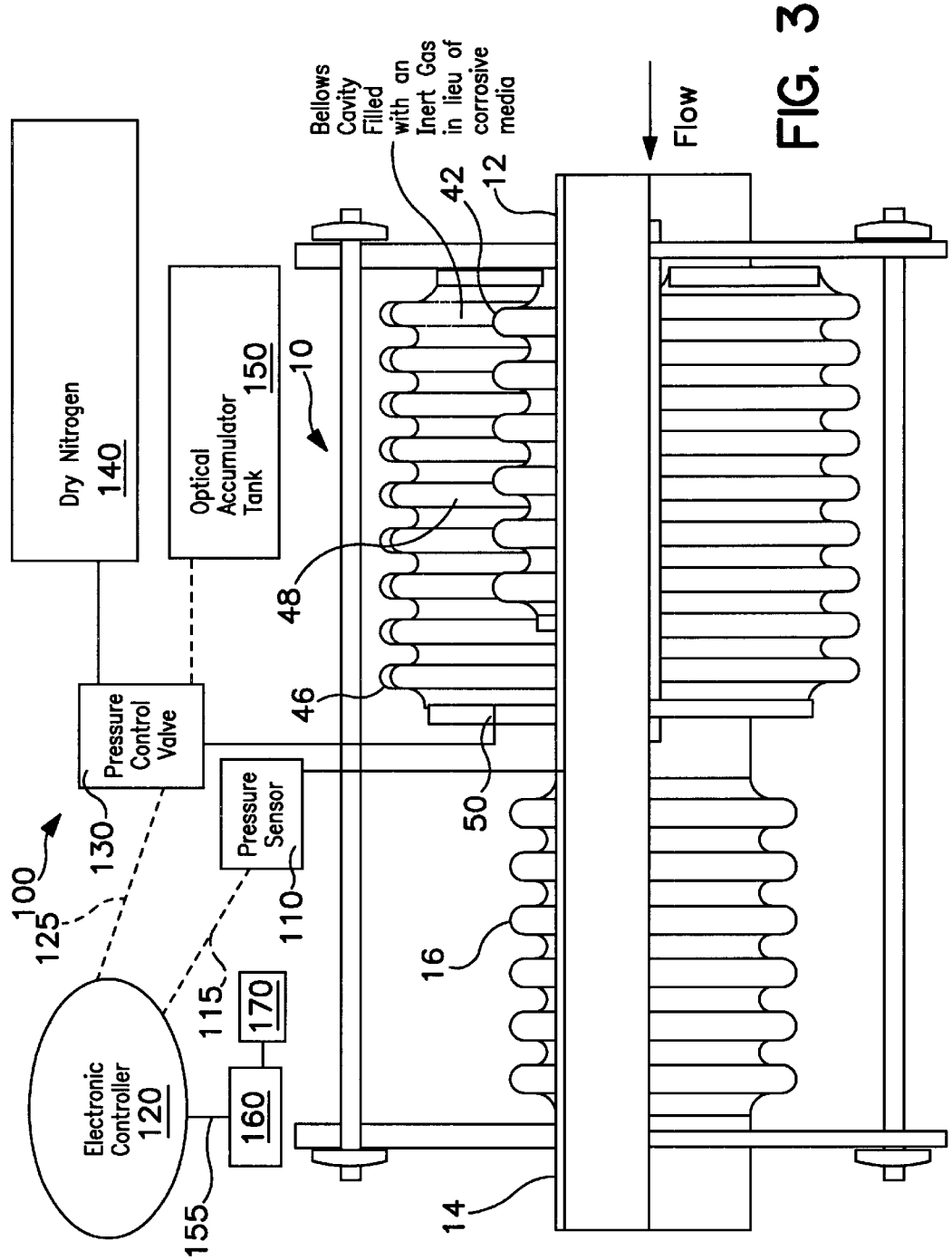

METHOD AND APPARATUS FOR MONITORING PIPELINE EXPANSION JOINT CONDITIONS

BACKGROUND OF THE INVENTION

1. Field of the Invention

The present invention is directed to expansion joints for high-pressure pipeline systems, and in particular, to methods and apparatus for monitoring pipeline expansion joint conditions, particularly in pressure-balanced expansion joints.

2. The Prior Art

When axial deflections exist in pipelines, expansion joints are required, in order to accommodate the changes in dimensions and/or relative positioning of pipeline components. One such environment for an expansion joint is in the exhaust from a turbine in a conventional fossil-fueled electric power generating plant.

One such type of expansion joint typically found in the just-mentioned environment is a pressure-balanced expansion joint (PBEXJ). A PBEXJ employs a first bellows (flow path bellows) to provide the fluid connection between two pipe ends. A second pair of bellows (balancing bellows) is concentrically arranged, to define an enclosed fluid space between them. The flow path bellows and the balancing bellows are typically arranged consecutively along the length of the expansion joint. The ends of the balancing bellows are mechanically connected to the pipe ends, so that separation of the pipe ends results in compression of the balancing bellows, while the flow path bellows extends. A flange plate surrounds one pipe end, but is movable relative to it. One end of the set of balancing bellows is attached to this first flange plate. The opposite end of the set of balancing bellows is affixed to the pipe end surrounded by the first flange plate, so that the balancing bellows encircle one pipe end and do not cross a gap between pipe ends. A second flange plate is affixed to the other pipe end, on the opposite side of the flow path bellows. Tie rods connect the two flange plates, so that when the pipe ends move apart, as the flow path bellows extends, the tie rods move the first flange plate relative to the pipe end it surrounds, causing the paired balancing bellows to be compressed. This results in a compression of whatever medium (air or other compressible fluid) is in the enclosed volume. This compression of the enclosed volume provides resistance to the extension movements of the flow path bellows, and acts as a damper, to smooth out pressure fluctuations and pressure-induced thrust forces that would tend to drive the pipe ends apart. Typically, a compression-limiting stop will be provided, to prevent overcompression of the flow path bellows, and likewise prevent overexpansion of the paired balancing bellows. By suitable selection of the diameters and effective cross-sectional areas of the various components, using known calculation skills available to one of ordinary skill in the art, the compression forces created in the balancing bellows, upon expansion of the flow path bellows, will counterbalance the expansion thrust, and cause the joint to stabilize at a particular position.

An advantage of such an expansion joint, is its ability to absorb externally imposed axial movement without imposing additional pressure loading on a system, so such joints are often used when additional pressure loading would be objectionable. The force resulting from the bellows in the expansion joint are not eliminated, but are typically not significant in comparison to the externally applied pressure thrusts that the joint is being used to accommodate. When a PBEXJ is used, forces that may change the length of the expansion joint will not be transferred to sensitive connections of the piping to the system.

The enclosed volume between the balancing bellows must be sealed, or substantially sealed, in order for the balancing bellows section to have significant damping effect, beyond the spring rates of the respective bellows. The medium that is used to fill the space typically has been air, or even the actual working medium. The latter is often an unfortunate choice, in that such media are often quite corrosive to the material of the bellows.

Prior art pressure-balanced expansion joints may be susceptible to variations in conditions in the various components that may affect the performance of the expansion joint. For example, drastic changes in temperature can affect the response of the enclosed volume in the balancing bellows to compression. In addition, thermally induced changes in dimension can effect the careful balancing of forces obtained by the particular structure.

It would be desirable to provide a method and apparatus for monitoring the conditions in a pipeline expansion joint, in particular a pressure-balanced expansion joint, in order to address changes in pipe line conditions, to alter the expansion joint's ability to function in the face of such pipeline condition changes.

This and other desirable characteristics of the present invention will become apparent in light of the present specification, including claims, and drawings.

SUMMARY OF THE INVENTION

The present invention is directed, in part, to an apparatus for monitoring pipeline expansion joint conditions, for use with a pressure-balanced expansion joint of the type incorporating a flow path bellows connecting first and second pipe ends in fluid communication with one another and at least first and second balancing bellows defining a variable enclosed volume.

The apparatus comprises at least one sensor operably configured to sense and respond to environmental conditions existing within a pipeline fluid flow through a pressure-balanced expansion joint. The at least one sensor is further operably configured to generate a first signal corresponding to a particular value of at least one quantifiable characteristic of the environment existing within a pipeline fluid flow through a pressure-balanced expansion joint.

A control apparatus is operably connected to the sensor and configured to receive the first signal corresponding to a particular value of at least one quantifiable characteristic of the environment existing within a pipeline fluid flow through a pressure-balanced expansion joint.

The control apparatus is further operably configured to compare the first signal received from the sensor with numerical values stored in memory corresponding to various potential environmental conditions of a pipeline fluid flow through a pressure-balanced expansion joint and determine the environmental condition to which the received first signal corresponds.

The control apparatus is further operably configured, upon determination of the environmental condition to which the first signal corresponds, to generate a second signal.

The apparatus further comprises a source of compressible medium,

A flow control valve is operably connected to at least the source of compressible medium and the volume defined by first and second balancing bellows of a pressure-balanced expansion joint.

The flow control valve is further operable configured to have at least two operating positions, a first operating position preventing flow through the flow control valve, and a second operating position permitting flow between the source of compressible medium, and the volume defined by first and second balancing bellows of a pressure-balanced expansion joint.

The second signal is configured to direct the flow control valve to one of the at least two operating positions, depending upon the environmental condition to which the first signal corresponds, to, in turn, add compressible medium, remove compressible medium and/or maintain the mass of compressible medium within the defined volume.

The flow control valve may be provided with at least three positions, and the apparatus further comprises a fluid accumulator, operably connected to the flow control valve, the third operating position of the flow control valve permitting flow between the fluid accumulator and the volume defined by first and second balancing bellows of a pressure-balanced expansion joint.

The apparatus may further comprise the control apparatus further being operably configured, upon determination of the environmental condition to which the received first signal corresponds, to generate a third signal. A message transmittal apparatus may be operably configured to receive the third signal generated by the control apparatus, and in response thereto transmit a message to at least one designated recipient, at a location remote from the expansion joint, advising the recipient of the sensed environmental condition at the expansion joint.

The invention also comprises, in part, a method for monitoring pipeline expansion joint conditions, for use with a pressure-balanced expansion joint of the type incorporating a flow path bellows connecting first and second pipe ends in fluid communication with one another and at least first and second balancing bellows defining a variable enclosed volume, the method comprising the steps of:

providing at least one sensor operably configured to sense and respond to environmental conditions existing within a pipeline fluid flow through a pressure-balanced expansion joint;

the at least one sensor being further operably configured to generate a first signal corresponding to a particular value of at least one quantifiable characteristic of the environment existing within a pipeline fluid flow through a pressure-balanced expansion joint;

operably connecting a control apparatus to the sensor, the control apparatus being operably configured to receive the first signal corresponding to a particular value of at least one quantifiable characteristic of the environment existing within a pipeline fluid flow through a pressure-balanced expansion joint, further operably configuring the control apparatus to compare the first signal received from the sensor with numerical values stored in memory corresponding to various potential environmental conditions of a pipeline fluid flow through a pressure-balanced expansion joint and determine the environmental condition to which the received first signal corresponds, generating a second signal with the control apparatus, upon determination of the environmental condition to which the first signal corresponds;

providing a source of compressible medium;

operably connecting a flow control valve to at least the source of if compressible medium and the volume defined by first and second balancing bellows of a pressure-balanced expansion joint, operably configuring the flow control valve to have at least two operating positions, a first operating position preventing flow through the flow control valve, and a second operating position permitting flow between the source of compressible medium, and the volume defined by first and second balancing bellows of a pressure-balanced expansion joint;

the second signal directing the flow control valve to one of the at least two operating positions, depending upon the environmental condition to which the first signal corresponds, to, in turn, add compressible medium, remove compressible medium and/or maintain the mass of compressible medium within the defined volume.

In the method of the present invention, the flow control valve may be provided with at least three positions, and the apparatus further comprising the step of operably connecting a fluid accumulator to the flow control valve, the third operating position of the flow control valve permitting flow between the fluid accumulator and the volume defined by first and second balancing bellows of a pressure-balanced expansion joint.

The method may further comprise the step of:

operably configuring the control apparatus to generate, upon determination of the environmental condition to which the received first signal corresponds, a third signal; and providing a message transmittal apparatus operably configured to receive the third signal generated by the control apparatus, and in response thereto transmit a message to at least one designated recipient, at a location remote from the expansion joint, advising the recipient of the sensed environmental condition at the expansion joint.

BRIEF DESCRIPTION OF THE DRAWINGS

FIG. 3 is a schematic illustration of a system for monitoring conditions in a pressure-balanced expansion joint, according to the present invention.

DETAILED DESCRIPTION OF THE DRAWINGS

Figure 1:
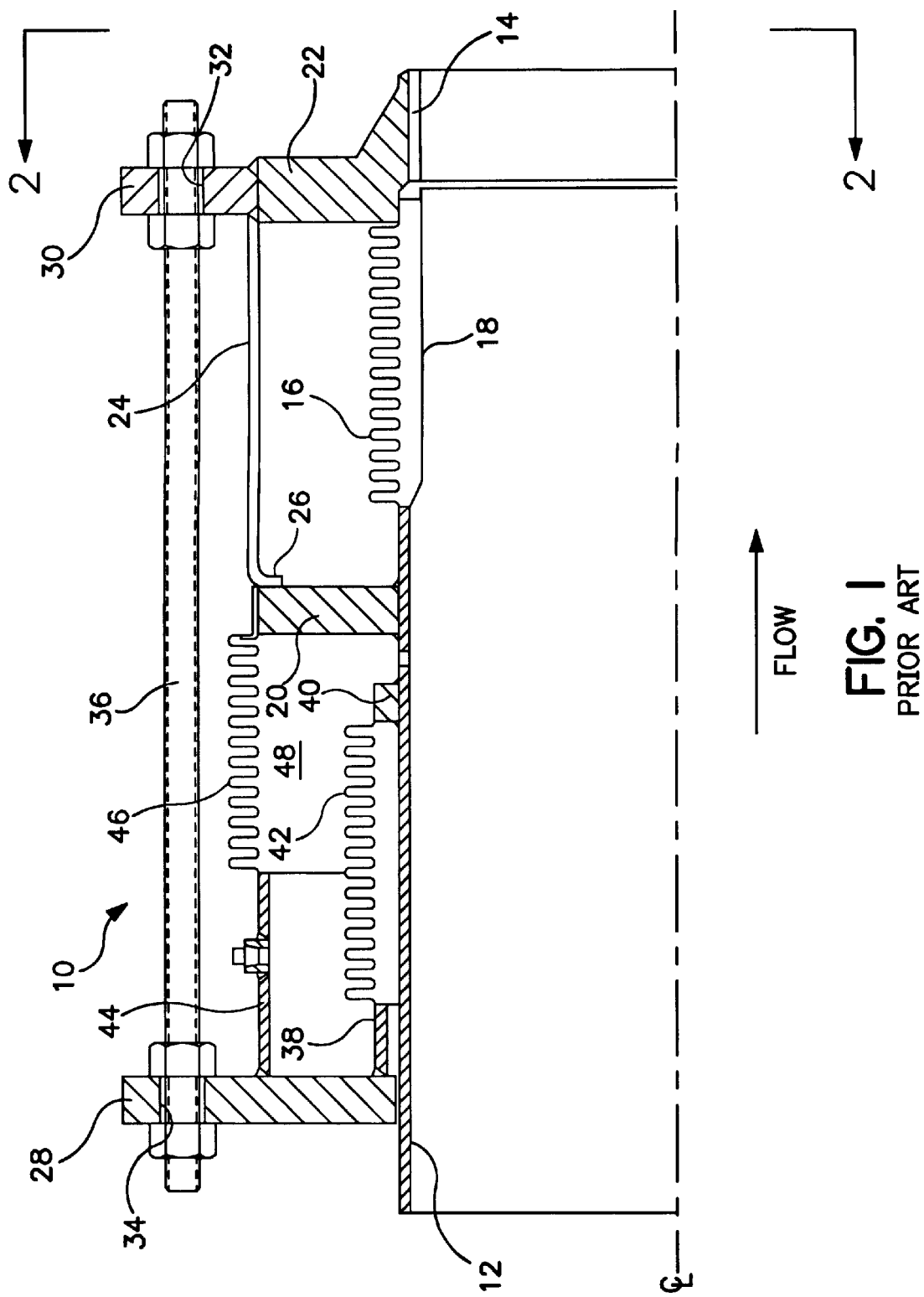
FIG. 1 is a side elevation, in section, of an upper half of a typical pressure-balanced expansion joint that may be used in accordance with the principles of the present invention.

While this invention is susceptible of embodiment in many different forms, there is shown in the drawings and will be discussed herein in detail, a preferred embodiment of the invention, with the understanding that the present disclosure is intended to be considered as an exemplification of the principles of the invention and is not intended to limit the invention to the embodiment illustrated.

Figure 2:
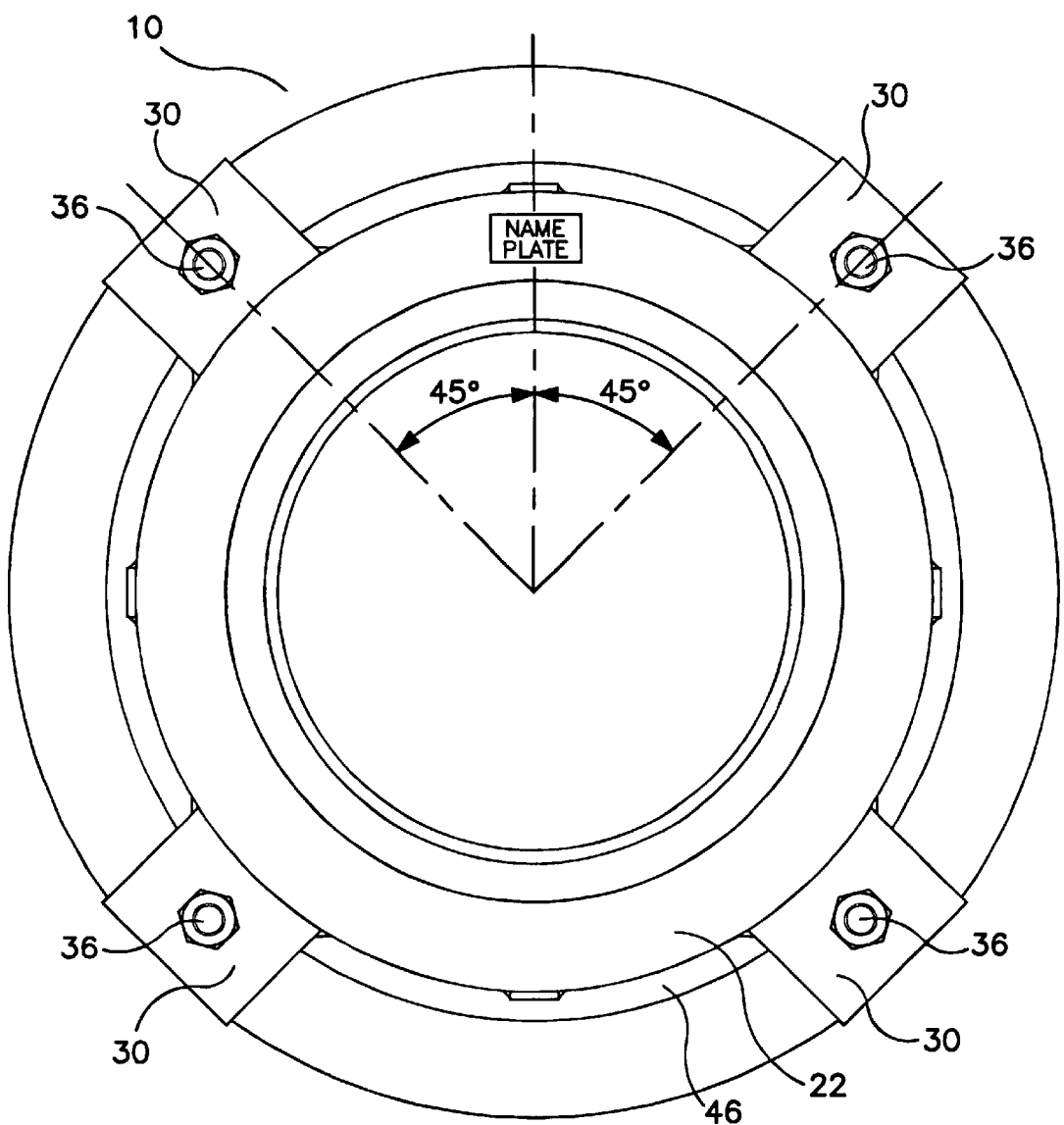
FIG. 2 is an end elevation, in section, of the pressure-balanced expansion joint of FIG. 1.

FIG. 1 is a side elevation, in section, of an upper half of a typical pressure-balanced expansion joint that may be used in accordance with the principles of the present invention. It is to be understood that the pressure-balanced expansion joint of FIG. 1 is substantially symmetrical about the centerline $C_L$, FIG. 2 is an end elevation, in section, of the pressure-balanced expansion joint of FIG. 1.

Expansion joint 10, which may be used, for example, to connect two pipes in a high pressure steam turbine exhaust system, connects two pipe ends 12, 14. The arrow indicates the direction of flow. Flow path (or line) bellows 16 connects pipe ends 12, 14 in a fluid-tight manner, with the connection being in the form of continuous welds or brazes or the like, between the adjacent surfaces. Liner tube 18 may be provided, typically connected to the upstream pipe end 12, for providing some protection to flow path bellows 16.

Circumferential flange 20 is affixed, e.g., by welding, to an outer surface of pipe end 12. Circumferential flange 22 is affixed to or formed on pipe end 14. A circumferential extending annular collar 24 is affixed to an upstream face of flange 22. An inwardly turning lip 26 is configured to abut against a downstream face of flange 20, to provide a stop, that prevents overcompression of expansion joint 10.

Circumferential flange 28 is provided to surround pipe end 12, with a circumferential clearance between the outer surface of pipe end 12 and the inner diameter of flange 28, that ensures that flange 28 can freely move longitudinally relative to pipe end 12. Ears 30 are positioned at circumferentially spaced locations along the periphery of flange 22. Apertures 32 are provided in ears 30. Corresponding apertures 34 may be provided in flange 28, or in corresponding ears emanating from flange 28, so that apertures 32, 34 are aligned, to permit tie rods 36 to axially affix flange 28 relative to flange 22. Tie rods 36 also provide support to flange 28, so that flange 28 is centered, relative to pipe end 12.

Axially extending annular collar 38 is affixed to a downstream face of flange 28, at a radial position close to the inner diameter of flange 28. Radially short annular band 40 is affixed to an outer surface of pipe end 12, downstream of flange 28. Inner balancing bellows 42 is sealingly affixed at its ends, e.g., by welding, to collar 38 and band 40. Axially extending annular collar 44 is affixed to a downstream face of flange 28, at a position radially outward of collar 38. Outer balancing bellows 46 is sealingly affixed at its ends, e.g., by welding, to collar 44 and flange 20.

Outer balancing bellows 46 and inner balancing bellows 42 define between them a generally annular cylindrical volume 48 that is preferably fully sealed. A valve 50 is provided in collar 44, for permitting the inletting of a compressible fluid that may or may not be under pressure, into volume 48.

A typical pressure-balanced expansion joint, such as joint 10, is typically installed, in the orientation shown in FIG. 1, at minimum possible length. Once the pipeline is running, the steady-state condition will be a slight extension of bellows 16, a corresponding slight compression of bellows 42, 46, and axial spacing between lip 26 and flange 20. If the flow conditions tend toward an increase in line pressure, that would tend to thrust pipe end 14 away from pipe end 12, bellows 16 expands, and tie rods 36 pull flange 28 along with pipe end 14, causing bellows 46 and 42 to compress, in turn causing the pressure in volume 48 to rise, creating a counterthrust in the upstream direction on flange 28, limiting and stabilizing the expansion of the joint.

Once installed, joint 10 is left to operate, responding to line pressure changes in the manner dictated by the configuration of the components, and the composition and initial conditions of the compressible medium in volume 48. The performance of joint 10 will depend upon the pressure of the medium as installed; that is, a greater pressure at installation, will result in greater resistance to expansion of the joint, that if the medium is installed at a lower initial pressure. Accordingly, the initial conditions of the joint at installation are a compromise, based upon the likely range of operating conditions that the joint will encounter during its useful life, which, of course, may result in inefficient operation at the extremes of the operating range, or during relatively rapidly changing conditions, and may also result in premature failure of the joint during operating conditions that are outside of the presumed range of operating conditions. Also, such expansion joints are typically not configured to provide any kind of indication as to their operational condition, such as an indication of impending failure. Usually, failure or impending in such devices is detected only upon personal visual inspection, or by the resultant pressure effects upon up- or downstream components of the system.

FIG. 3 is a schematic illustration of a system for monitoring conditions in a pressure-balanced expansion joint, according to the present invention. FIG. 3 illustrates schematically a method and apparatus for providing flexibility to such an expansion joint. In addition, the invention of FIG. 3 may also be suitably configured for providing a method and apparatus for providing an indication of failure status. Expansion joint 10 of FIG. 3 is understood to be substantially identical in construction to joint 10 of FIGS. 1 and 2, but merely shown in simplified form and rig oriented in the reverse direction, as compared to FIGS. 1 and 2.

Apparatus 100 includes one or more pressure (and/or other) sensor(s) 110, that is/are situated so as to sense the line pressure (and/or temperature or other physical characteristic) of the flow. For simplicity of language, one sensor 110 will be discussed, but it is understood that more than one sensor of similar or different type, may be employed. Sensor 110 is suitably connected to an electronic controller 120, which may be a PC, a microprocessor, or other suitably configured control device. Pressure control valve 130 is also connected to a supply of an inert compressible medium 140, such as nitrogen gas. Pressure control valve 130 may also be connected to an optional (thus the broken line) accumulator tank 150. Suitable piping to valve 50, providing communication with volume 48 between bellows 42 and 46 also connects valve 130. Preferably valve 130 will be configured so as to be a two- or three-position valve: 1) closed, permitting no flow; 2) permitting flow (in either direction) between compressible medium source 140 and valve 50; or 3) permitting flow between valve 50 and accumulator 150 (if provided).

Electronic controller 120 may be suitably configured or programmed, using known programming techniques, to actuate valve 130, to either have no flow; input or take out medium from volume 48; or direct the flow of medium between volume 48 and accumulator 150.

Preferably, in operation, pressure (or other) sensor 110 will be continuously exposed to the flow conditions in the pipeline. A signal representative of or corresponding to one or more sensed physical characteristics (pressure, temperature, steam quality, etc.) will be relayed to controller 120 via one or more signal connections) 115. Controller 120 receives the signal, processes it as necessary, to convert it into numerical value(s), and compares the processed values to numerical values stored in memory, that represent various possible conditions.

For example, if the sensed value(s) correspond to nominal operating conditions, controller 120 will send or maintain a control signal, via signal connection(s) 125, to control valve 130 (which may be a solenoid or servomotor actuated valve) to establish or maintain valve 130 in a closed orientation.

Alternatively, if the pressure, for example, being sensed, corresponds to values in excess of the normal operating range, the existing volume and pressure of the compressible medium in volume 48 may be overwhelmed by the rise in line pressure, resulting in an overextension of joint 10. Thus, a higher base pressure for the compressible medium may be appropriate. Controller 120 then sends a control signal to valve 130, causing a flow connection between source 140 and valve 50, so that more compressible medium is inletted into volume 48. The increased mass of compressible medium means greater pressure for a given amount of compression of bellows 42, 46, and thus more capacity to resist pressure induced thrust forces. However, if the pressure rise or fluctuations that are sensed suggest that the pressure induced thrust might create a pressure rise in volume 48 that might damage either or both of bellows 42, 46 or their connections to their respective mounting surfaces, then, after or instead of connection to source 140, controller 120 might be programmed to send a control signal to valve 130 to connect volume 48 to accumulator 150 (if provided). When that condition obtains, under excess pressure induced thrust, some of the volume of compressible medium is conveyed from volume 48 into accumulator 150, and then returned to volume 48 by accumulator 150, when the overpressure condition subsides.

In an alternative embodiment of the invention, controller 120 may also be provided with data/numerical values stored in memory that might correspond to failure or indications of imminent failure of the joint. For example, a certain combination of pressure, temperature, and flow rate might suggest a failure in the vicinity of the joint (drastic loss of line back-pressure, while retaining flow rate, etc.). Controller 120 might be connected 155, via phone lines or radio transmitter, to then transmit a signal to one or more predetermined sources 160, that causes a warning message or failure indication to be received, e.g., via prerecorded phone, fax, email or even conventional mail message to received at one or more predetermined destinations/recipients 170.

The foregoing description and drawings merely explain and illustrate the invention and the invention is not limited thereto except insofar as the appended claims are so limited, as those skilled in the art who have the disclosure before them will be able to make modifications or variations therein without departing from the scope of the invention.

What is claimed is:

1. The combination of an apparatus for monitoring pipeline expansion joint conditions, and a pressure-balanced expansion joint, having a fluid flow path therethrough, the combination comprising:

a pressure-balanced expansion joint connecting first and second pipe ends;

at least one sensor operably configured to sense and respond to environmental conditions existing within pipeline fluid flow through the pressure-balanced expansion joint;

the at least one sensor being further operably configured to generate a first signal corresponding to a particular value of at least one quantifiable characteristic of the environment existing within the pipeline fluid flow through the pressure-balanced expansion joint;

a control apparatus, operably connected to the at least one sensor and configured to receive said first signal, the control apparatus being further operably configured to compare the first signal received from the at least one sensor with numerical values stored in memory corresponding to various potential environmental conditions of the pipeline fluid flow through the pressure-balanced expansion joint and determine the environmental condition to which the received first signal corresponds, the control apparatus further being operably configured, upon determination of the environmental condition to which the first signal corresponds, to generate a second signal;

a source of compressible medium;

a flow control valve, operably connected to at least the source of compressible medium and a variable enclosed volume defined by at least first and second balancing bellows of the pressure-balanced expansion joint, the flow control valve being further operably configured to have at least two operating positions, a first operating position preventing flow through the flow control valve, and a second operating position permitting flow between the source of compressible medium and the variable enclosed volume defined by the at least first and second balancing bellows of the pressure-balanced expansion joint;

the second signal being configured to direct the flow control valve to one of the at least two operating positions, and depending upon the environmental condition to which the first signal corresponds, to, in turn, add compressible medium, remove compressible medium and/or maintain the mass of compressible medium within the defined variable enclosed volume.

2. The combination according to claim 1, wherein the flow control valve is provided with three operating positions, and the apparatus further comprises a fluid accumulator, operably connected to the flow control valve, the third operating position of the flow control valve permitting flow between the fluid accumulator and the variable enclosed volume defined by the at least first and second balancing bellows of the pressure-balanced expansion joint.

3. The apparatus according to claim 1 further comprising:

the control apparatus further being operably configured, upon determination of the environmental condition to which the received first signal corresponds, to generate a third signal;

a message transmittal apparatus operably configured to receive the third signal generated by the control apparatus, and in response thereto transmit a message to at least one designated recipient, at a location remote from the expansion joint, advising the recipient of the sensed environmental condition at the expansion joint.

4. A method for monitoring pipeline expansion joint conditions, in a pressure-balanced expansion joint, the method comprising the steps of:

providing a pressure-balanced expansion joint connecting first and second pipe ends;

providing at least one sensor operably configured to sense and respond to environmental conditions existing within the pipeline fluid flow through the pressure-balanced expansion joint;

the at least one sensor being further operably configured to generate a first signal corresponding to a particular value of at least one quantifiable characteristic of the environment existing within the pipeline fluid flow through the pressure-balanced expansion joint;

operably connecting a control apparatus to the at least one sensor, the control apparatus being operably configured to receive said first signal, further operably configuring the control apparatus to compare the first signal received from the at least one sensor with numerical values stored in memory corresponding to various potential environmental conditions of the pipeline fluid flow through the pressure-balanced expansion joint and determine the environmental condition to which the received first signal corresponds, generating a second signal with the control apparatus, upon determination of the environmental condition to which the first signal corresponds;

providing a source of compressible medium;

operably connecting a flow control valve to at least the source of compressible medium and a variable enclosed volume defined by at least first and second balancing bellows of the pressure-balanced expansion joint, operably configuring the flow control valve to have at least two operating positions, a first operating position preventing flow through the flow control valve, and a second operating position permitting flow between the source of compressible medium and the variable enclosed volume defined by the at least first and second balancing bellows of the pressure-balanced expansion joint;

the second signal directing the flow control valve to one of the at least two operating positions, and depending upon the environmental condition to which the first signal corresponds, to, in turn, add compressible medium, remove compressible medium and/or maintain the mass of compressible medium within the defined variable enclosed volume.

5. The method according to claim 4, wherein the flow control valve is provided with three operating positions, and the method further comprising the step of operably connecting a fluid accumulator to the flow control valve, the third operating position of the flow control valve permitting flow between the fluid accumulator and the variable enclosed volume defined by the at least first and second balancing bellows of the pressure-balanced expansion joint.

6. The method according to claim 4 further comprising the step of:

operably configuring the control apparatus to generate, upon determination of the environmental condition to which the received first signal corresponds, a third signal; and providing a message transmittal apparatus operably configured to receive the third signal generated by the control apparatus, and in response thereto transmit a message to at least one designated recipient, at a location remote from the expansion joint, advising the recipient of the sensed environmental condition at the expansion joint.

7. The combination of an apparatus for monitoring pipeline expansion joint conditions, and a pressure-balanced expansion joint, according to claim 1, wherein the pressure-balanced expansion joint comprises:

a flow path bellows having a first end sealingly connected to the first pipe end and a second end sealingly connected to the second pipe end;

the first balancing bellows, circumferentially surrounding a portion of, and at least indirectly affixed at a first end to, the first pipe end;

the second balancing bellows, circumferentially surrounding a portion of, and at least indirectly affixed at a first end to, the first pipe end;

the first and second balancing bellows being at least indirectly affixed to one another at respective second ends thereof, thus defining the variable enclosed volume therebetween, not in communication with the fluid flow path;

the second ends of the first and second balancing bellows being mechanically connected to the second pipe end so that upon relative movement of the first and second pipe ends away from one another, the variable enclosed volume is decreased, and upon relative movement of the first and second pipe ends toward one another, the variable enclosed volume is increased.

8. The method according to claim 4, wherein the pressure-balanced expansion joint comprises:

a flow path bellows having a first end sealingly connected to the first pipe end and a second end sealingly connected to the second pipe end;

the first balancing bellows, circumferentially surrounding a portion of, and at least indirectly affixed at a first end to, the first pipe end;

the second balancing bellows, circumferentially surrounding a portion of, and at least indirectly affixed at a first end to, the first pipe end;

the first and second balancing bellows being at least indirectly affixed to one another at respective second ends thereof, thus defining the variable enclosed volume therebetween, not in communication with the fluid flow path;

the second ends of the first and second balancing bellows being mechanically connected to the second pipe end so that upon relative movement of the first and second pipe ends away from one another, the variable enclosed volume is decreased, and upon relative movement of the first and second pipe ends toward one another, the variable enclosed volume is increased.

* * * * *